(12) United States Patent
White et al.

(10) Patent No.: US 9,270,168 B2
(45) Date of Patent: Feb. 23, 2016

(54) ELECTROMAGNETIC INTERFERENCE (EMI) REDUCTION IN MULTI-LEVEL POWER CONVERTER

(71) Applicant: Hamilton Sundstrand Corporation, Windsor Locks, CT (US)

(72) Inventors: Adam Michael White, Belvidere, IL (US); Mustansir Kheraluwala, Lake Zurich, IL (US); Steven A. Davidson, Pecatonica, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 482 days.

(21) Appl. No.: 13/836,662

(22) Filed: Mar. 15, 2013

(65) Prior Publication Data
US 2014/0268967 A1 Sep. 18, 2014

(51) Int. Cl.
H02M 7/538 (2007.01)
H02M 1/44 (2007.01)
H02M 7/487 (2007.01)
H02M 7/501 (2007.01)

(52) U.S. Cl.
CPC .............. *H02M 1/44* (2013.01); *H02M 7/487* (2013.01); *H02M 7/501* (2013.01); *H02M 7/538* (2013.01)

(58) Field of Classification Search
CPC ....... H02M 7/48–7/501; H02M 7/538–7/5381; H02M 1/44
See application file for complete search history.

(56) References Cited

U.S. PATENT DOCUMENTS

| | | | |
|---|---|---|---|
| 3,403,381 A | 9/1968 | Hanner | |
| 3,584,398 A | 6/1971 | Meyer et al. | |
| 3,096,411 A | 9/1975 | Lind et al. | |
| 5,214,575 A | 5/1993 | Sugishima et al. | |
| 5,483,680 A | 1/1996 | Talbot | |
| 5,552,980 A | 9/1996 | Garces et al. | |
| 5,933,339 A * | 8/1999 | Duba ................. | H02M 7/49 363/41 |
| 6,023,417 A | 2/2000 | Hava et al. | |
| 6,049,474 A | 4/2000 | Platnic | |
| 6,101,109 A | 8/2000 | Duba et al. | |
| 6,687,319 B1 | 2/2004 | Perino et al. | |
| 6,784,625 B1 | 8/2004 | Andrews | |
| 6,819,077 B1 | 11/2004 | Seibel et al. | |
| 7,049,778 B2 | 5/2006 | Katanaya | |
| 7,773,351 B2 | 8/2010 | Kanai | |
| 7,834,574 B2 | 11/2010 | West et al. | |
| 8,228,012 B2 | 7/2012 | Hamasaki et al. | |
| 8,269,370 B2 | 9/2012 | Haga | |

(Continued)

OTHER PUBLICATIONS

European Search Report dated Dec. 2, 2014, for corresponding European Application No. 14159412.7.

(Continued)

*Primary Examiner* — Jessica Han
(74) *Attorney, Agent, or Firm* — Kinney & Lange, P.A.

(57) ABSTRACT

A multi-level power converter system includes a multi-level power converter configured to synthesize at least three direct current (DC) voltages into an alternating current (AC) output voltage, and includes a plurality of transistors. A controller generates pulse-width modulation (PWM) signals used to control a state of the plurality of transistors of the multi-level converter by comparing first and second carrier signals to a reference signals, wherein a period of the first and second carrier signals is randomly varied from a nominal period.

12 Claims, 7 Drawing Sheets

(56) References Cited

U.S. PATENT DOCUMENTS

| | | |
|---|---|---|
| 8,384,336 B2 | 2/2013 | Gunji |
| 8,558,500 B2 | 10/2013 | Yamakawa et al. |
| 8,604,732 B2 | 12/2013 | Kawashima et al. |
| 8,963,527 B2 | 2/2015 | Jing |
| 2003/0108098 A1 | 6/2003 | Geddes |
| 2003/0117815 A1* | 6/2003 | Saada ............... H02M 1/12 363/40 |
| 2004/0217748 A1 | 11/2004 | Andrews |
| 2005/0174076 A1 | 8/2005 | Katanaya |
| 2006/0120121 A1 | 6/2006 | Chang et al. |
| 2006/0215430 A1 | 9/2006 | Fu et al. |
| 2006/0227483 A1* | 10/2006 | Akagi ............... H02M 1/12 361/118 |
| 2007/0242489 A1 | 10/2007 | Chen |
| 2010/0039157 A1 | 2/2010 | Kaeriyama et al. |
| 2010/0253305 A1 | 10/2010 | Melanson et al. |
| 2011/0298416 A1 | 12/2011 | Singh et al. |
| 2012/0075900 A1 | 3/2012 | Nakagawa |
| 2012/0212197 A1 | 8/2012 | Fayed et al. |
| 2013/0257332 A1 | 10/2013 | Nakano et al. |
| 2013/0278229 A1 | 10/2013 | Chai et al. |
| 2013/0279216 A1 | 10/2013 | Nguyen et al. |
| 2014/0226379 A1* | 8/2014 | Harrison ............ H02M 7/5395 363/71 |
| 2014/0268967 A1 | 9/2014 | White et al. |

OTHER PUBLICATIONS

Non-Final Office Action from U.S. Appl. No. 13/836,662, dated Jul. 8, 2015, 22 pages.

\* cited by examiner

ELECTROMAGNETIC INTERFERENCE (EMI) REDUCTION IN MULTI-LEVEL POWER CONVERTER

BACKGROUND

The present invention relates to electromagnetic interference (EMI) noise mitigation for multi-level power converters.

Switching power converters are often used to convert an alternating current (AC) voltage into a direct current (DC) voltage, or to convert a DC voltage into an AC voltage. Specifically DC to AC converters are commonly used to provide variable frequency and voltage AC power to loads such as AC motors, and AC to DC converters can be used to provide a regulated DC voltage to DC loads. One example of such a power converter is a two-level (2L) converter, which is able to synthesize two node voltages ("levels") at a phase terminal. These converters typically use pulse-width modulation (PWM) at a fixed switching frequency in order to approximate a desired continuous waveform. PWM is known to cause distortions in the output waveform, which are typically undesirable.

The use of multi-level converter topologies, which synthesize three or more voltages ("levels"), is becoming more prevalent, as these converters are able to produce less distorted waveforms than two-level converters. One multi-level converter topology that synthesizes three node voltages ("levels") at the phase output is a neutral point clamped three-level converter. This converter uses carrier-based PWM signals with a fixed switching frequency to turn on and off the transistors in each converter phase leg. Although this three-level converter has less distortion than a two-level converter, the use of PWM still causes some distortion in the output waveform.

SUMMARY

A multi-level power converter system is disclosed herein. The multi-level power converter system includes a multi-level power converter that is configured to synthesize at least three direct current (DC) voltages into an alternating current (AC) output voltage, and which includes a plurality of transistors. A controller generates pulse-width modulation (PWM) signals used to control a state of the plurality of transistors of the multi-level converter by comparing first and second carrier signals to a reference signal, wherein a period of the first and second carrier signals is randomly varied from a nominal period.

A controller is disclosed herein for providing PWM control of a multi-level power converter that synthesizes at least three DC voltages into an AC output voltage. The controller includes a random value generator that generates random values, and a summer that adds the random values generated by the random value generator to a nominal value to define a period of first and second carrier signals. A first carrier signal generator generates the first carrier signal having the period defined by the output of the summer, wherein the period of the first carrier signal is varied from a nominal period by the addition of the random value provided by the random value generator to the nominal value. A second carrier signal generator generates the second carrier signal having the period defined by the output of the summer, wherein the period of the second carrier signal is varied from the nominal period by the addition of the random value provided by the random value generator to the nominal value. A first comparator compares the first carrier signal to a reference signal to generate first PWM signals used to control a state of a first set of transistors of the multi-level power converter. A second comparator compares the second carrier signal to a reference signal to generate second PWM signals used to control a state of a second set of transistors of the multi-level power converter.

A method of reducing electromagnetic interference (EMI) of a multi-level power converter that synthesizes at least three DC voltages into an AC output voltage is disclosed herein. The method includes generating random values and periodically adjusting a nominal value with a generated random value to determine a randomized period of first and second carrier signals. The first and second carrier signals are generated with each having the randomized period. First PWM signals are generated for use in controlling a state of a first set of transistors of the multi-level power converter by comparing the first carrier signal to a reference signal. Second PWM signals are generated for use in controlling a state of a second set of transistors of the multi-level power converter by comparing the second carrier signal to the reference signal. The first and second PWM signals are then provided to the multi-level power converter.

DETAILED DESCRIPTION

Figure 1:
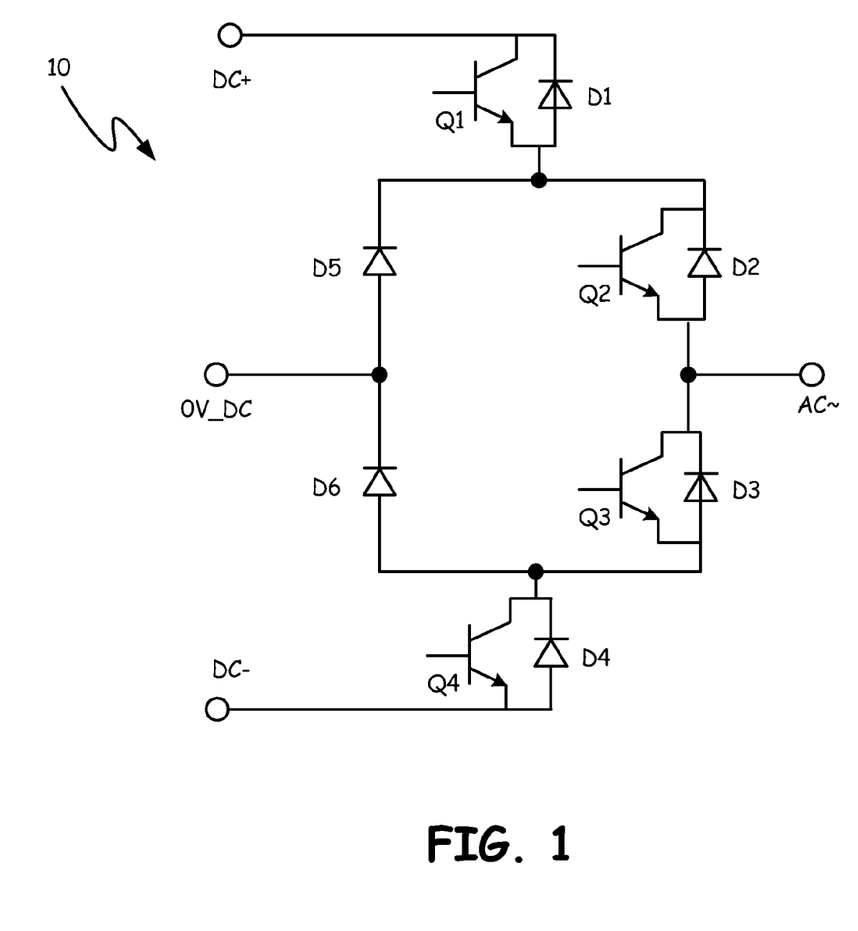
FIG. 1 is a schematic diagram of a multi-level power converter.

FIG. 1 is a schematic diagram of multi-level power converter 10. Multi-level power converter 10 is configured as a neutral point clamped converter, with DC voltage inputs DC+, 0V_DC, and DC−, synthesized into an AC output voltage at terminal AC~. Multi-level power converter 10 includes transistors Q1, Q2, Q3 and Q4 and diodes D1, D2, D3, D4, D5 and D6 connected as shown in FIG. 1. In operation, PWM signals $S_{Q1}$, $S_{Q2}$, $S_{Q3}$ and $S_{Q4}$ are provided at the gates of transistors Q1, Q2, Q3 and Q4, respectively, to control the switching of the transistors to produce a continuous output waveform.

Figure 2A:
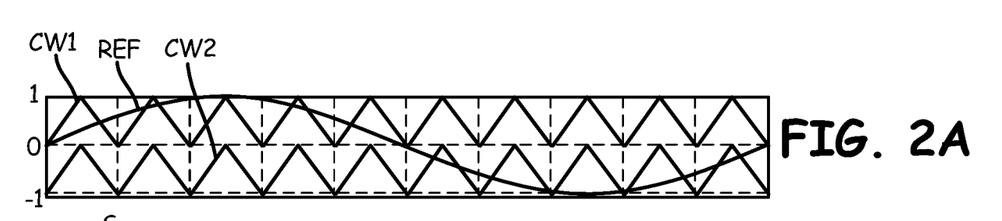
FIGS. 2A-2E are waveform diagrams illustrating carrier wave and PWM control signals used to synthesize a continuous output waveform in a multi-level power converter.
Figure 2B:
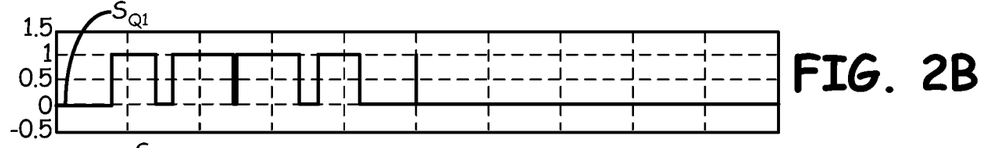
Figure 2C:
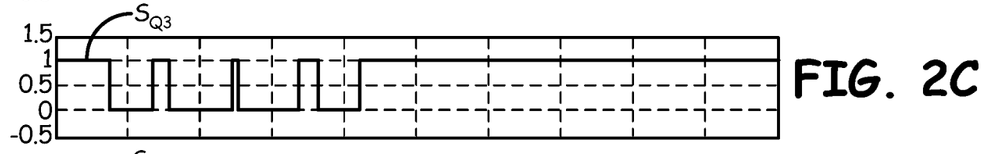

FIGS. 2A-2E are waveform diagrams illustrating the carrier waves, reference signal and PWM signals used to generate a continuous output waveform in multi-level power converter 10 (FIG. 1). FIG. 2A shows low frequency reference signal REF and two separate high frequency triangular carrier signals CW1 and CW2. Reference signal REF is compared to carrier signal CW1 to create PWM command signals $S_{Q1}$ and $S_{Q3}$ (FIGS. 2B and 2C) used to turn on and off transistors Q1 and Q3 (transistor Q3 is complementary to transistor Q1). Likewise, reference signal REF is compared to carrier signal CW2 to create PWM command signals $S_{Q2}$ and $S_{Q4}$ (FIGS.

Figure 2D:
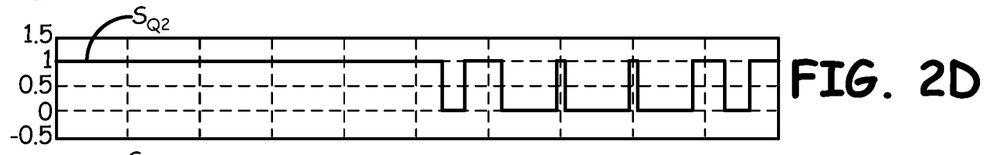
Figure 2E:
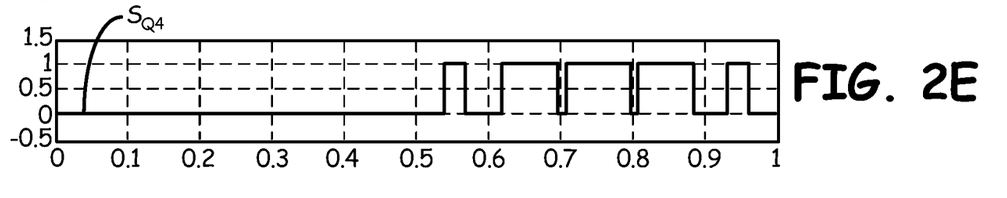

2D and 2E) used to turn on and off transistors Q2 and Q4 (transistor Q4 is complementary to transistor Q2).

PWM-created waveforms are subject to distortion—that is, a true continuous waveform is typically not achieved. The distortion of the output waveform from a true continuous waveform generates electromagnetic interference (EMI). The peak amplitudes of the EMI/distortions of the output waveform in the frequency domain may be reduced by adding random fractional variation to the PWM switching frequency. A multi-level power converter system controller that employs random fractional variation of a carrier signal in order to minimize EMI in the output waveform is shown in FIG. 3.

Figure 3:
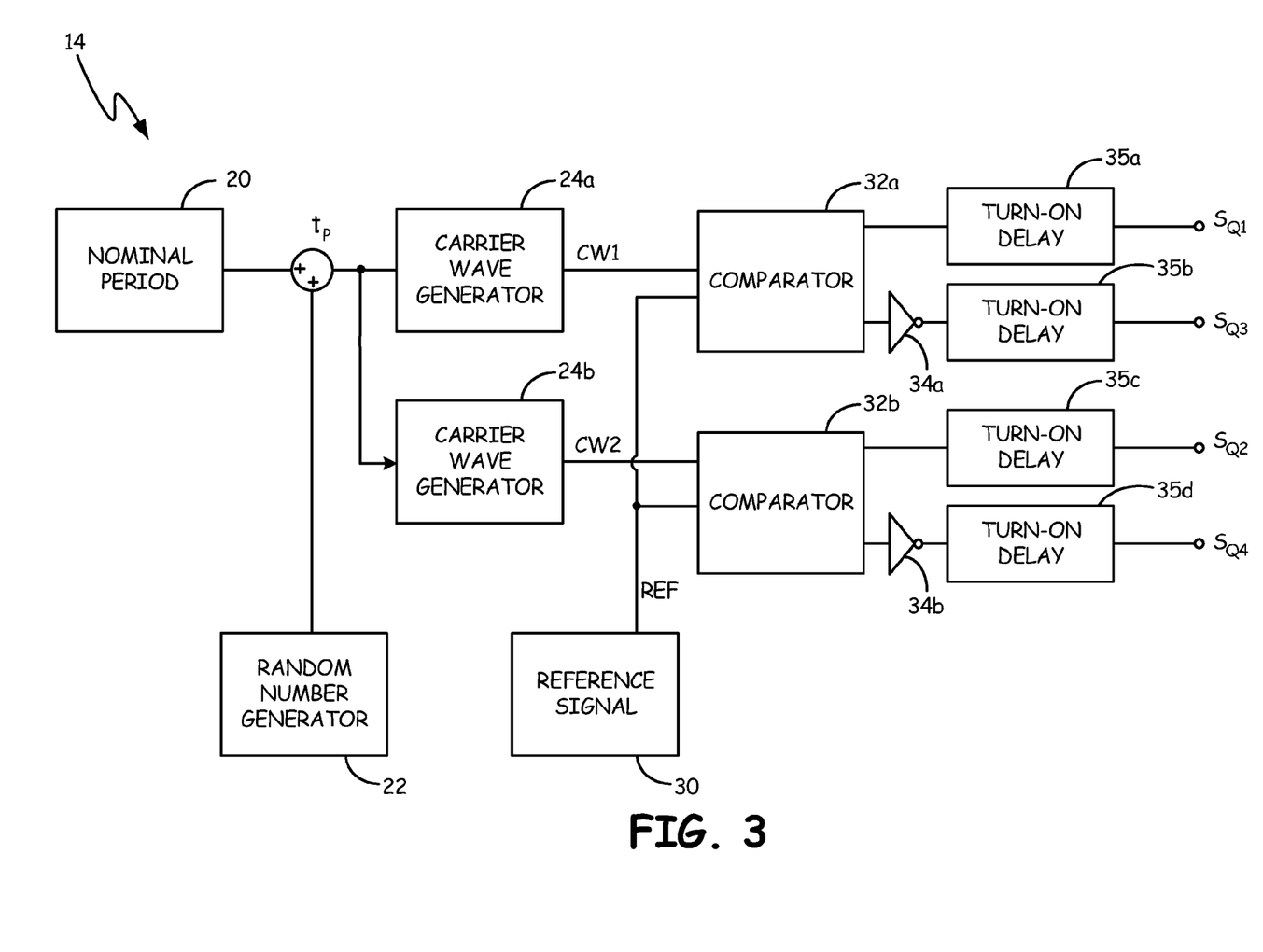
FIG. 3 is a functional block diagram illustrating functions performed by a controller in generating PWM signals provided to a multi-level power converter system.

FIG. 3 is a functional block diagram illustrating functions performed by controller 14 in generating PWM signals $S_{Q1}$, $S_{Q2}$, $S_{Q3}$ and $S_{Q4}$ provided to multi-level power converter system 10. In the embodiment shown in FIG. 3, PWM signals $S_{Q1}$, $S_{Q2}$, $S_{Q3}$ and $S_{Q4}$ are generated by comparing carrier wave signals CW1 and CW2 to a reference signal REF. The period ($t_p$) of carrier wave signals CW1 and CW2 is determined based on the input provided to carrier wave generators 24a and 24b, respectively. In the embodiment shown in FIG. 3, the period $t_p$ of carrier waves CW1 and CW2 is selected by summing a nominal period 20 with an output of random number generator 22. The random number output provided by random number generator 22 may be positive or negative values, and may be range-limited in amplitude, such that the random values may not exceed minimum and maximum limits. The input $t_p$ provided to carrier wave generators 24a and 24b varies based on the output of random number generator 22, and as a result of the varying input $t_p$ the period of carrier wave signals CW1 and CW2 is varied. Low frequency reference signal 30, such as a sinusoidal signal in an exemplary embodiment, is compared to high frequency carrier signals CW1 and CW2, which may be triangular wave signals in an exemplary embodiment, by comparators 32a and 32b. The output of comparator 32a, delayed by turn-on delay 35a, provides switching control signal $S_{Q1}$, and the output of comparator 32a, inverted by inverter 34a and delayed by turn-on delay 35b, provides switching control signal $S_{Q3}$. Similarly, the output of comparator 32b, delayed by turn-on delay 35c, provides switching control signal $S_{Q2}$, and the output of comparator 32b, inverted by inverter 34b and delayed by turn-on delay 35d, provides switching control signal $S_{Q4}$. Switching control signals $S_{Q1}$, $S_{Q2}$, $S_{Q3}$ and $S_{Q4}$ are used to turn on and off transistors Q1, Q2, Q3 and Q4, respectively, of multi-level converter system 10 (FIG. 1).

EMI can occur in high frequency components of the AC node voltage (at terminal AC~, FIG. 1) at a multitude of discrete frequencies in the infinite frequency set of $n(1/t_c)+/-m(1/t_r)$, where n and m are integers, $t_c$ is the nominal carrier period and $t_r$ is the reference signal period. This EMI is mitigated by the utilization of random number generator 22. Specifically, random number generator 22 is used to make an adjustment to the nominal carrier period 20 ($t_p$), such as by adding a positive or negative random value, so that carrier signals CW1 and CW2 have randomized periods $t_p$. This results in the high frequency EMI components of the output waveform being spread (or smeared) from the discrete frequencies at which high peak magnitudes of EMI would otherwise occur in a carrier-based PWM scheme, to a band of frequencies spread around these discrete frequencies with reduced peak magnitudes of EMI. This concept is illustrated graphically in the waveform diagrams of FIGS. 4, 5 and 6.

Figure 4:
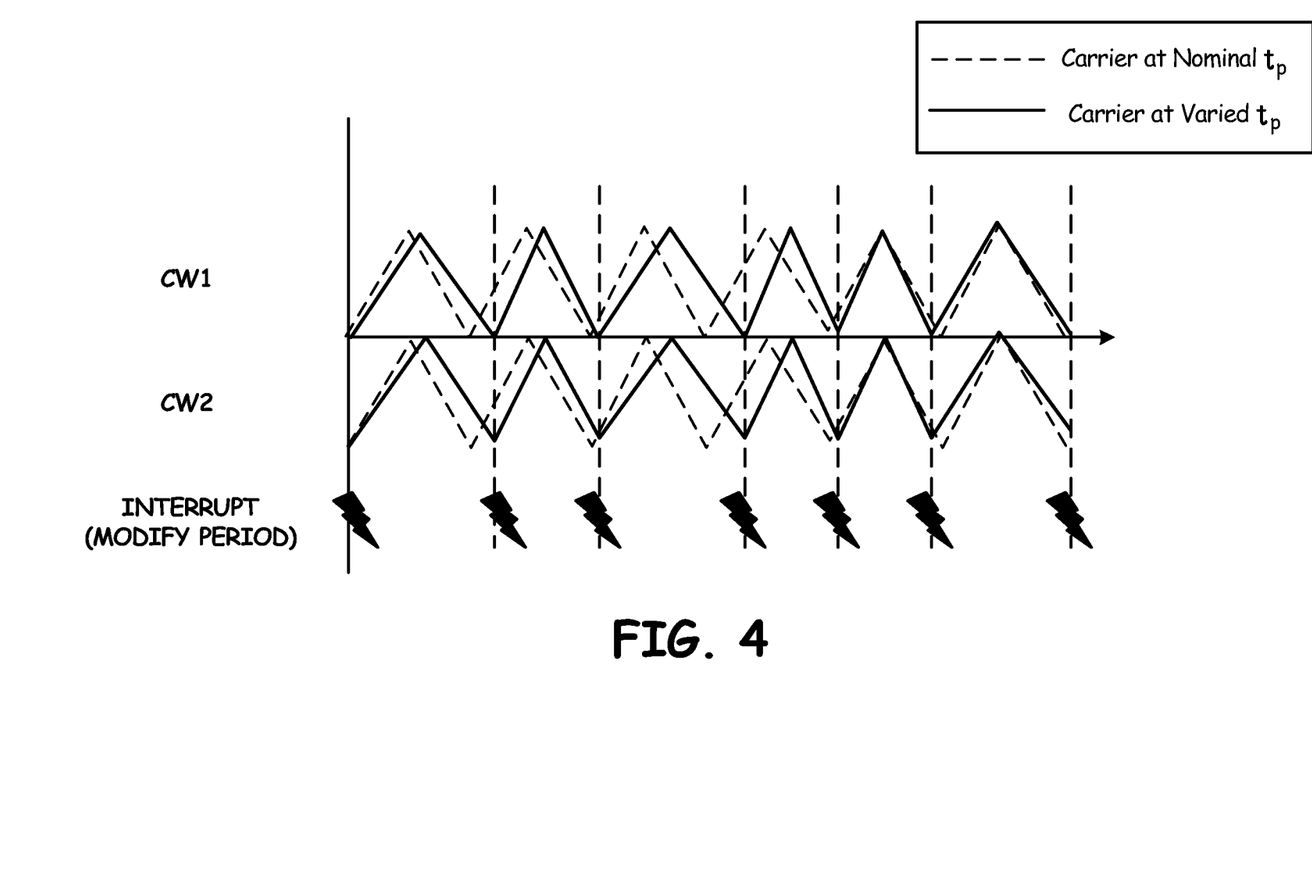
FIG. 4 is a waveform diagram illustrating carrier signals generated according to an embodiment of the present invention.

FIG. 4 is a waveform diagram illustrating carrier signals CW1 and CW2 generated according to an embodiment of the present invention. As shown, carrier signals CW1 and CW2 have a nominal period illustrated by the waveforms shown in dotted lines, and have a varying, randomized period that is adjusted after each full cycle of carrier signals CW1 and CW2. The varying, randomized periods are set in an exemplary embodiment by adding/subtracting a random number (generated by random number generator 22, FIG. 3) to/from a nominal carrier signal period.

Figure 5:
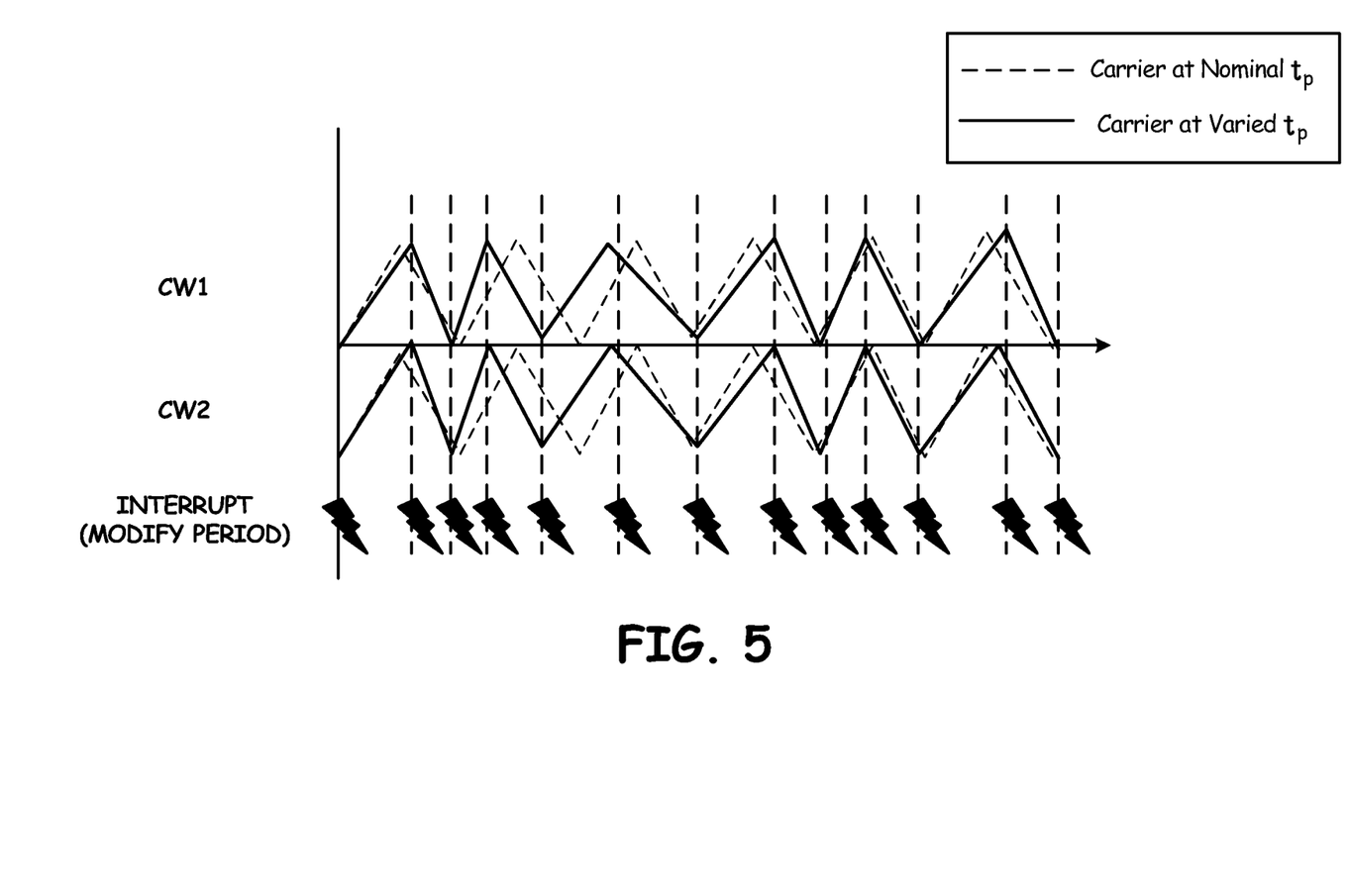
FIG. 5 is a waveform diagram illustrating carrier signals generated according to an embodiment of the present invention.

FIG. 5 is a waveform diagram illustrating carrier signals CW1 and CW2 generated according to another embodiment of the present invention. As shown, carrier signals CW1 and CW2 have a nominal period illustrated by the waveforms shown in dotted lines, and have a varying, randomized period that is adjusted after each half cycle of carrier signals CW1 and CW2. The varying, randomized periods are set in an exemplary embodiment by adding/subtracting a random number (generated by random number generator 22, FIG. 3) to/from a nominal carrier signal period.

Figure 6:
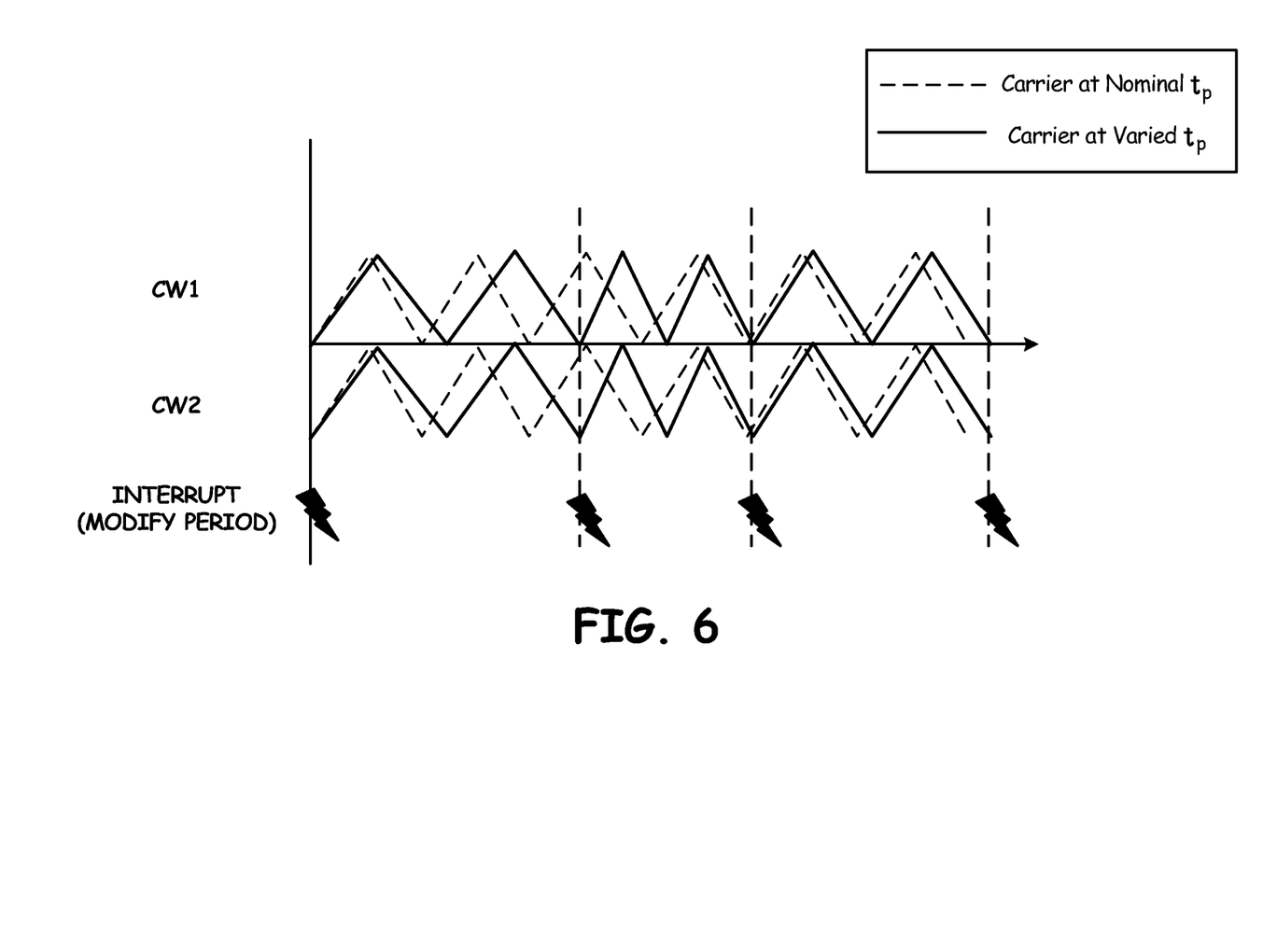
FIG. 6 is a waveform diagram illustrating carrier signals generated according to an embodiment of the present invention.

FIG. 6 is a waveform diagram illustrating carrier signals CW1 and CW2 generated according to a further embodiment of the present invention. As shown, carrier signals CW1 and CW2 have a nominal period illustrated by the waveforms shown in dotted lines, and have a varying, randomized period that is adjusted after two full cycles of carrier signals CW1 and CW2. The varying, randomized periods are set in an exemplary embodiment by adding/subtracting a random number (generated by random number generator 22, FIG. 3) to/from a nominal carrier signal period.

In the embodiments shown in FIGS. 4-6, the variation of the carrier signal period results in a spreading or smearing of the high frequency EMI noise components of the AC output voltage from the discrete frequencies where these EMI noise components have high peak magnitudes, so that the high frequency EMI noise components are seen across a wide band of frequencies with reduced peak amplitudes.

While examples of the present invention have been shown in FIGS. 4-6 where a new randomized period is generated to adjust the period of the carrier signals at full, half, and two period intervals, it should be understood that other timing arrangements for the generation of a new random number to adjust the carrier signal period are possible and contemplated herein, such as other fractions or multiples of the carrier signal period, based on a timer that is unrelated to the carrier signal period, or other arrangements.

Figure 7:
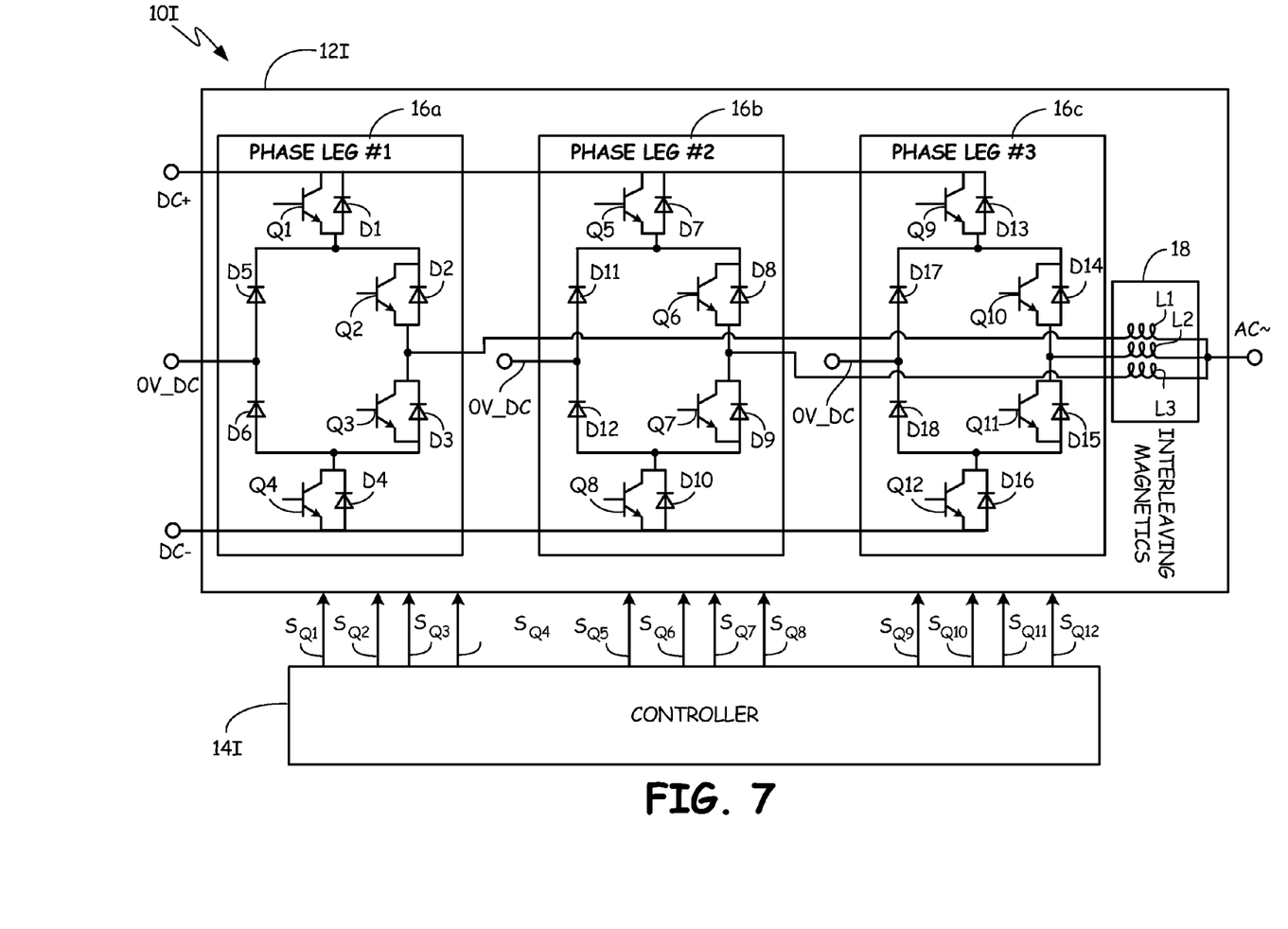
FIG. 7 is a schematic diagram of an interleaved multi-level power converter

FIG. 7 is a schematic diagram of interleaved power converter system 10I, which includes multi-level converter 121 and controller 14I. Multi-level converter 121 includes phase legs 16a, 16b and 16c and interleaving magnetics 18 connected between DC terminals DC+, 0V_DC, DC− and AC terminal AC~. Phase leg 16a includes transistors Q1, Q2, Q3 and Q4 and diodes D1, D2, D3, D4, D5 and D6 connected as shown. Phase leg 16b includes transistors Q5, Q6, Q7 and Q8 and diodes D7, D8, D9, D10, D11 and D12 connected as shown. Phase leg 16c includes transistors Q9, Q10, Q11 and Q12 and diodes D13, D14, D15, D16, D17 and D18 connected as shown. Interleaving magnetics 18 include inductors L1, L2 and L3 connected to respective phase legs 16a, 16b and 16c.

Each of phase legs 16a, 16b and 16c is able to synthesize three node voltages ("levels"), and is configured as multi-level converter 10 is shown in FIG. 1. PWM control signals $S_{Q1}$, $S_{Q2}$, $S_{Q3}$ and $S_{Q4}$ are output from controller 14I to control the turning on and off of transistors Q1, Q2, Q3 and Q4 in phase leg 16a. PWM control signals $S_{Q5}$, $S_{Q6}$, $S_{Q7}$ and $S_{Q8}$ are output from controller 14I, phase shifted from PWM control signals $S_{Q1}$, $S_{Q2}$, $S_{Q3}$ and $S_{Q4}$ (by generating phase shifted versions of carrier signals CW1 and CW2 in controller 14I and comparing those phase shifted carrier signals to reference signal REF), to control the turning on and off of transistors Q5, Q6, Q7 and Q8 in phase leg 16b. PWM control signals $S_{Q9}$, $S_{Q10}$, $S_{Q11}$ and $S_{Q12}$ are output from controller 14I, further phase shifted from PWM control signals $S_{Q5}$, $S_{Q6}$, $S_{Q7}$ and $S_{Q8}$ (by generating further phase shifted versions of carrier signals CW1 and CW2 in controller 14I and comparing those further phase shifted carrier signals to reference signal REF), to control the turning on and off of transistors Q9, Q10, Q11 and Q12 in phase leg 16c. In some embodiments, the interleaved configuration shown in FIG. 7 may provide additional reduction of EMI in the output voltage waveform.

While an example of the present invention has been shown and described in FIG. 7 for an interleaved power converter having three phase legs, it should be understood that any number of interleaved phase legs may be employed utilizing the principles and concepts described herein.

Discussion of Possible Embodiments

The following are non-exclusive descriptions of possible embodiments of the present invention.

A multi-level power converter system includes, among other things, a multi-level power converter that is configured to synthesize at least three direct current (DC) voltages into an alternating current (AC) output voltage, and which includes a plurality of transistors, and a controller that generates pulse-width modulation (PWM) signals used to control a state of the plurality of transistors of the multi-level converter by comparing first and second carrier signals to a reference signals, wherein a period of the first and second carrier signals is randomly varied from a nominal period.

The multi-level power converter system of the preceding paragraph can optionally include, additionally and/or alternatively, any one or more of the following features, configurations and/or additional components:

The controller includes a random number generator that generates random values that vary the period of the first and second carrier signals.

The random values generated by the random number generator vary the period of the carrier signal at half-cycle intervals of the first and second carrier signals.

The random values generated by the random number generator vary the period of the carrier signal at full-cycle intervals of the first and second carrier signals.

The random values generated by the random number generator vary the period of the carrier signal at multiple-cycle intervals of the first and second carrier signals.

The random values generated by the random number generator are positive and negative values The random values generated by the random number generator are range-limited such that the random values may not exceed minimum and maximum limits.

The multi-level power converter comprises a neutral point clamped converter configuration.

The multi-level power converter comprises a plurality of phase legs in an interleaved configuration, and the controller generates PWM signals used to control a state of transistors in each of the plurality of phase legs of the multi-level power converter.

A controller for providing pulse-width modulation control of a multi-level power converter that synthesizes at least three DC voltages into an AC output voltage includes, among other things, a random value generator that generates random values, a summer that adds the random values generated by the random value generator to a nominal value to define a period of first and second carrier signals, a first carrier signal generator that generates the first carrier signal having the period defined by the output of the summer, wherein the period of the first carrier signal is varied from a nominal period by the addition of the random value provided by the random value generator to the nominal value, a second carrier signal generator that generates the second carrier signal having the period defined by the output of the summer, wherein the period of the second carrier signal is varied from the nominal period by the addition of the random value provided by the random value generator to the nominal value, a first comparator that compares the first carrier signal to a reference signal to generate first pulse-width modulation (PWM) signals used to control a state of a first set of transistors of the multi-level power converter, and a second comparator that compares the second carrier signal to the reference signal to generate second PWM signals used to control a state of a second set of transistors of the multi-level power converter.

The controller of the preceding paragraph can optionally include, additionally and/or alternatively, any one or more of the following features, configurations and/or additional components:

The random value generator randomly generates positive and negative values.

The random values generated by the random number generator are range-limited such that the random values may not exceed minimum and maximum limits.

The period of the first and second carrier signals is modified once per half-cycle of the first and second carrier signals.

The period of the first and second carrier signals is modified once per full-cycle of the first and second carrier signals.

The period of the first and second carrier signals is modified once per multiple cycles of the first and second carrier signals.

The first and second PWM signals each comprise two complementary PWM signals.

A method of reducing EMI of a multi-level power converter that synthesizes at least three DC voltages into an AC output voltage includes, among other things, generating random values, periodically adjusting a nominal value with a generated random value to determine a randomized period of first and second carrier signals, generating the first carrier signal and the second carrier signal each having the randomized period, generating first pulse-width modulation (PWM) signals used to control a state of a first set of transistors of the multi-level power converter by comparing the first carrier signal to a reference signal, generating second PWM signals used to control a state of a second set of transistors of the multi-level power converter by comparing the second carrier signal to a reference signal, and providing the first and second PWM signals to the multi-level power converter.

The method of the preceding paragraph can optionally include, additionally and/or alternatively, any one or more of the following features, configurations and/or additional steps:

The random values are positive and negative values, and adjusting the nominal value with the generated random value comprises adding the generated random value to the nominal value to determine the randomized period of the first carrier signal.

The random values generated by the random number generator are range-limited such that the random values may not exceed minimum and maximum limits.

The period of the first and second carrier signals is modified once per half-cycle of the first and second carrier signals.

The period of the first and second carrier signals is modified once per full-cycle of the first and second carrier signals.

The period of the first and second carrier signals is modified once per multiple cycles of the first and second carrier signals.

The first and second PWM signals each comprise two complementary PWM signals.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A controller for providing pulse-width modulation control of a multi-level power converter that synthesizes at least three direct current (DC) voltages into an alternating current (AC) output voltage, the controller comprising:
   a random value generator that generates random values;
   a summer that adds the random values generated by the random value generator to a nominal value to define a period of first and second carrier signals;
   a first carrier signal generator that generates the first carrier signal having the period defined by the output of the summer, wherein the period of the first carrier signal is varied from a nominal period by the addition of the random value provided by the random value generator to the nominal value;
   a second carrier signal generator that generates the second carrier signal having the period defined by the output of the summer, wherein the period of the second carrier signal is varied from the nominal period by the addition of the random value provided by the random value generator to the nominal value;
   a first comparator that compares the first carrier signal to a reference signal to generate first pulse-width modulation (PWM) signals used to control a state of a first set of transistors of the multi-level power converter; and
   a second comparator that compares the second carrier signal to the reference signal to generate second PWM signals used to control a state of a second set of transistors of the multi-level power converter.

2. The controller of claim 1, wherein the random value generator randomly generates positive and negative values.

3. The controller of claim 1, wherein the period of the first and second carrier signals is modified once per half-cycle of the first and second carrier signals.

4. The controller of claim 1, wherein the period of the first and second carrier signals is modified once per full-cycle of the first and second carrier signals.

5. The controller of claim 1, wherein the period of the first and second carrier signals is modified once per multiple cycles of the first and second carrier signals.

6. The controller of claim 1, wherein the first and second PWM signals each comprise two complementary PWM signals.

7. A method of reducing electromagnetic interference (EMI) of a multi-level power converter that synthesizes at least three direct current (DC) voltages into an alternating current (AC) output voltage, the method comprising:
   generating random values;
   periodically adjusting a nominal value with a generated random value to determine a randomized period of first and second carrier signals;
   generating the first carrier signal and the second carrier signal each having the randomized period;
   generating first pulse-width modulation (PWM) signals used to control a state of a first set of transistors of the multi-level power converter by comparing the first carrier signal to a reference signal;
   generating second PWM signals used to control a state of a second set of transistors of the multi-level power converter by comparing the second carrier signal to a reference signal; and
   providing the first and second PWM signals to the multi-level power converter.

8. The method of claim 7, wherein the random values are positive and negative values, and adjusting the nominal value with the generated random value comprises adding the generated random value to the nominal value to determine the randomized period of the first carrier signal.

9. The method of claim 7, wherein the period of the first and second carrier signals is modified once per half-cycle of the first and second carrier signals.

10. The method of claim 7, wherein the period of the first and second carrier signals is modified once per full-cycle of the first and second carrier signals.

11. The method of claim 7, wherein the period of the first and second carrier signals is modified once per multiple cycles of the first and second carrier signals.

12. The method of claim 7, wherein the first and second PWM signals each comprise two complementary PWM signals.

* * * * *